United States Patent [19]

Lang et al.

[11] Patent Number: 5,296,794
[45] Date of Patent: Mar. 22, 1994

[54] STATE OBSERVER FOR THE PERMANENT-MAGNET SYNCHRONOUS MOTOR

[75] Inventors: Jeffrey H. Lang, Waltham; Lawrence A. Jones, Cambridge, both of Mass.

[73] Assignee: Massachusetts Institute of Technology, Cambridge, Mass.

[21] Appl. No.: 47,245

[22] Filed: Apr. 13, 1993

Related U.S. Application Data

[63] Continuation of Ser. No. 668,393, Mar. 13, 1991, abandoned, which is a continuation of Ser. No. 264,087, Oct. 28, 1988.

[51] Int. Cl.[5] ............................................. H02P 1/46
[52] U.S. Cl. .................................... 318/715; 318/721; 318/809
[58] Field of Search ............... 318/715, 716, 717, 718, 318/719, 721, 723, 714, 799, 805, 809, 800

[56] References Cited

U.S. PATENT DOCUMENTS

| | | | |
|---|---|---|---|
| 4,442,393 | 4/1984 | Abbondanti | 318/805 |
| 4,484,128 | 11/1984 | Jotten et al. | 318/805 |
| 4,649,331 | 3/1987 | Jahns | 318/723 |
| 4,777,422 | 10/1988 | Slicker et al. | 318/800 |
| 4,792,741 | 12/1988 | Matsuo et al. | 318/723 |

OTHER PUBLICATIONS

Leonhard, W., *Control of Electrical Drives*, Springer-Verlag, 1985, pp. 244-255; 261-270.
Tamai et al, "Speed Sensor-Less Vector Control of Induction Motor with Model Reference Adaptive System" IEEE, Atlanta, Ga., 1987, Ia vol. 1, pp. 189-195.
Lumsdaine et al. ("A State Observer for Variable Reluctance Motors", U.S. Patent Application Ser. No. 927,532, and Proc. 15th Ann. Symp. Incremental Motion Control Syst. Dev., Urbana, Ill., 1986, pp. 267-273.
Okongwu et al. ("Optimal State Feedback Control of a Microalternator Using an Observer", IEEE Trans. Power App. Syst., vol. PAS-97, No. 2, pp. 594-602, 1978).
Yamashita et al., ("On the Estimation of the Transient State of a Synchronous Machine by an Optimal Observer", Int. Jour. Control., vol. 41, No. 2, pp. 417-428, 1985).
Gharban et al. ("Non-linear Dynamic Power System State Estimation", IEEE Trans. Power Syst., vol. PWRS-1, No. 3, pp. 276-283, Aug. 1986).
Novotny et al. ("Induction Machine Transfer Functions and Dynamic Response by Means of Complex Time Variables", IEEE Trans. Power App. Syst., vol. PAS-95, No. 4, pp. 1325-1335.
Verghese et al. ("Analysis of Instability in Electrical Machines", IEEE Trans. Ind. App., vol. IA-22, No. 4, pp. 852-864, Sep./Oct. 1986).
Takata et al. ("On the Estimation of Transient State of Power System by Discrete Nonlinear Observer", IEEE Trans. Power App. Syst., vol. PAS-94, No. 6, pp. 2135-2140).
Liu et al. ("Extending the Blondel-Park Transformation to Generalized Electrical Machines", Proc. 12th IMACS World Cong., Paris, Jul. 1988.
Thesis of Jones ("A State Observer for the Permanent-Magnet Synchronous Motor", MIT S. M. Thesis, May, 1988).

*Primary Examiner*—William M. Shoop, Jr.
*Assistant Examiner*—John W. Cabeca
*Attorney, Agent, or Firm*—Choate, Hall & Stewart

[57] ABSTRACT

An identity state observer for a smooth-rotor permanent-magnet synchronous motor is derived which reconstructs the electrical and mechanical states of the motor from current and voltage measurements. The observer operates in the rotor frame and estimates direct and quadrature stator currents, rotor velocity, and rotor position. Since the rotor position is estimated, the rotor reference frame is approximated using the latest rotor position estimate. The motor dynamics and the transformation into the estimated rotor frame are nonlinear and thus the observer and observer error dynamics are nonlinear. Therefore, small signal stability is analyzed from a linearized model. Simulations including realistic measurement disturbances are used to investigate the global stabilitiy and accuracy of the observer.

5 Claims, 5 Drawing Sheets

STATE OBSERVER FOR THE PERMANENT-MAGNET SYNCHRONOUS MOTOR

This is a continuation of copending application Ser. No. 07/668,393 filed on Mar. 13, 1991 abandoned, which is a continuation of U.S. Ser. No. 07/264,087 filed Oct. 28, 1988.

BACKGROUND OF THE INVENTION

This invention relates to a state observer for a permanent magnet or wound rotor synchronous motor.

Electric motors are traditionally used as actuators. However, they may also be used as sensors of the motion they actuate. This simultaneous operation as an actuator and sensor can be beneficial when additional motion sensors are too expensive, large, unreliable, or otherwise undesirable. In particular, the potential cost savings of eliminating a motion sensor can be great.

An electric motor can be successfully used as a sensor of its own motion because this motion effects the voltages and currents in it. Thus, the voltages and currents possess information concerning the motion. What is needed, then, is a means of extracting this information so as to estimate the desired motion. Some form of signal processing is necessary, which places additional demands on the control electronics. However, as digital processors continue to become faster and less expensive, this additional signal processing becomes less of a burden.

In this specification, an identity state observer is used to estimate the electrical and mechanical states of a smooth rotor permanent magnet synchronous motor. The estimated states are the direct and quadrature currents, the rotor velocity, and the rotor position. Thus, the output of the observer is precisely the states desired for typical implementations of field-oriented, or vector, control [5]. (Numbers in brackets refer to the references listed at the end of this specification.) An identity state observer utilizes a model of the dynamics of the machine observed and includes an innovation term multiplied by a gain. By "smooth rotor" is meant a machine having a single harmonic of air gap flux.

The estimation of motor motion using measurements of electrical variables is not a new idea. A wide variety of methods have already been investigated in the literature. At one extreme are waveform detection methods that are commonly associated with permanent-magnet and variable reluctance stepper motors; see references in [6]. These methods attempt to identify specific events such as peaks or zero crossings in the electrical waveforms that are the result of the back-emf of the rotating rotor. They have been successfully demonstrated for commutation needs, and may be implemented using inexpensive electronics, which is advantageous from a manufacturing viewpoint. However, they are not as accurate as possible because they do not utilize all the information present in the waveforms. The fact that the back-emf is always present while the rotor is moving means that back emf information which may reveal the position of the rotor is always present in the waveforms.

One way to extract all the information in the waveforms is to model the dynamics of the motor, drive these dynamics with the same input as is used to drive the real motor, and somehow ensure that errors between the modeled motor and real motor are minimized. If this can be done, then the states of the modeled motor will effectively summarize all the information in the waveforms up to the present time, and the model will accurately reflect the behavior of the real motor. In a state observer, an output is defined as a combination of the states and this output is compared with the equivalent measured output of the real motor. Any error between the two signals is then used to correct the state trajectory of the observer.

State observers have been studied for a wide variety of electric machines. For example, a linear observer based on the linearized model of a generator is studied in [8]. Although the observer is designed for operation at a specific operating point, it is shown that it performs satisfactorily for small perturbations over a wide range of operating conditions.

In [6] and in U.S. patent application Ser. No. 927,532, filed Nov. 5, 1986, an observer is developed for a variable reluctance motor where spatial variations in phase inductances affect the evolution of the flux in the phases as the rotor rotates. An observer is constructed that models the spatially-varying motor dynamics, and a very accurate position estimate is produced under a constant speed assumption. The structure of this observer is nonlinear since the motor dynamics and the feedback gain on the innovation are nonlinear functions of the estimated states.

In [10], an observer for a synchronous generator that has the structure of a linear observer, that is, constant gains on linear innovation, is applied to a nonlinear model. A potential drawback is that the observer in [10] does not exploit the unique qualities of the nonlinearities in the generator, and therefore misses the potential for even faster converging estimates.

A complex observer strcture may be found in [2]. There, optimal control theory is used to develop an observer which is optimal with respect to random system noise and random measurement noise. The system noise may be due either to modeling errors or disturbances. Though not deemed as such in the paper, the resulting observer may be called an invariant embedded observer. It is similar to an extended Kalman filter and, unfortunately, appears to have many of the same drawbacks as the extended Kalman filter, particularly the necessity of carrying along a system of covariance dynamics which increasese the order of the observer from four to fourteen. Although optimization with respect to system noise is clearly desirable, it incurs a heavy price. No consideration is made of the underlying nonlinear system. Rotating machines have strong symmetries that can be exploited to yield simpler structures. The invariant embedded observer would have to be demonstrably superior to other methods before it could be seriously considered for real-time application.

Models for alternating current motors are nonlinear and estimation theory for nonlinear systems is not well developed compared to the wealth of guidance available for linear systems, such as direct-current motors. However, there is considerable symmetry in alternating-current motor models which can be used to simplify an estimation problem. Ignoring this symmetry may lead to estimators that are more complex than necessary. The state observer according to the invention combines the ideas of a linear observer with the $d_q$ transformation that may be applied to smooth-rotor machines. The resulting state observer is one that could not have been developed from a general expression for a nonlinear system.

SUMMARY OF THE INVENTION

The observer for reconstructing electrical and mechanical states of a permanent magnet synchronous motor having a single harmonic of air gap flux includes apparatus adapted to measure the current in the motor. Computing apparatus is provided which is responsive to the currents in the motor and the voltages driving the motor adapted to compute the electrical and mechanical states of the motor from an observer model derived from the state equations of the motor transformed into the rotor frame of reference. The observer thus operates in the rotor frame and estimates direct and quadrature stator currents, rotor velocity, and rotor position.

Because the rotor position is estimated, the rotor reference frame is approximated using the latest rotor position estimate. The motor dynamics and the transformation into the estimated rotor frame are non-linear and thus the observer and observer error dynamics are non-linear. By transforming the motor dynamics into the rotor frame of reference, the electrical dynamics become linear and time invariant when the motor runs at constant speed. Furthermore, the small signal dynamics for all states about a constant speed equilibrium are linear and time invariant. The transformation into the rotor frame facilitates finding the appropriate gain matrix which multiplies an innovation term in the state observer.

DESCRIPTION OF THE PREFERRED EMBODIMENTS

Figure 1:
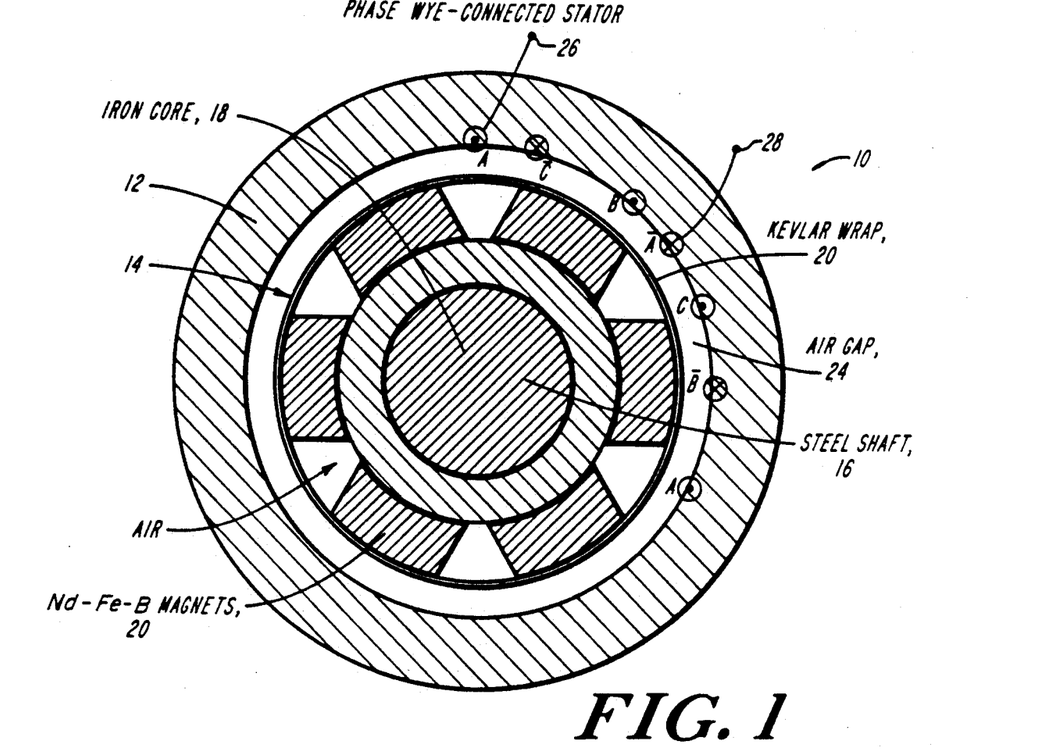
FIG. 1 is a cross-sectional view of a smooth rotor, permanent-magnet synchronous motor with surface mounted magnets.

The motor of interest in this invention is the smooth-rotor, permanent-magnet, synchronous motor having permanent magnets mounted on the rotor. Again, by "smooth-rotor" is meant a motor having a single harmonic of air gap flux. It should also be understood that the term "permanent magnet motor" comprehends also a wound rotor. A smooth rotor permanent magnet motor to which the invention applies is shown in FIG. 1. A motor 10 includes a three-phase wye-connected stator 12 within which is a rotor 14. The rotor 14 includes a steel shaft 16, an iron core portion 18 and Nd Fe B magnets 20 affixed to the iron core 18. In this embodiment, Kevlar wrap 22 surrounds the permanent magnets 20. The rotor 14 is separated from the stator 12 by air gap 24. It should be noted that the stator 12 may be delta connected instead of wye connected. Those skilled in the art will recognize that the stator is wound to generate the magnetic configuration illustrated in FIG. 1. The motor 10 is driven by applying two or three-phase voltage to leads 26 and 28. The circulating fields drag the rotor around as is widely appreciated.

Variable-speed drives using this type of motor have become popular due to the availability of improved magnets. A dynamic model for the motor 10 may be derived from the model of a generalized two-phase machine [3]. The resulting state-space model, presented in the stator 12 reference frame and described compactly in matrix notation, is $$\frac{di}{dt} = -\frac{R}{L} i - \frac{K}{L} N\omega J\exp(JN\theta) \begin{bmatrix} 1 \\ 0 \end{bmatrix} + \frac{1}{L} v \tag{1}$$

$$\frac{d\omega}{dt} = -\frac{B}{H} \omega + \frac{KN}{H} i^T J\exp(JN\theta) \begin{bmatrix} 1 \\ 0 \end{bmatrix} \tag{2}$$

$$- \frac{C}{H} \frac{\omega}{|\omega|} - \frac{1}{H} \tau$$

$$\frac{d\theta}{dt} = \omega. \tag{3}$$

The current vector i consists of two components in quadrature, namely $i_\alpha$, $i_\beta$. Hardware to measure these currents is usually available in a closed-loop control system. The voltage vector $\gamma$ consists of two components in quadrature, namely $\gamma_\alpha$ and $\gamma_\gamma$. These voltages may be measured. They are not usually measured in a control system since the controller usually commands voltage. Voltage may be measured to improve accuracy. In either case, voltages are assumed to be known. The stator phase inductance and resistance are L and R, respectively. The magnet constant is K, and the number of magnet pole pairs on the rotor is N. Therefore, there are N electrical cycles for every mechanical cycle of the motor shaft. The rotor speed is $\omega$ and the rotor position is $\theta$. The matrix J is given by $$J = \begin{bmatrix} 0 & -1 \\ 1 & 0 \end{bmatrix}. \tag{4}$$

The primary reason for using the matrix J is the compactness and simplicity of the resulting notation. Another reason for using J is that the above motor model may be easily collapsed further by using complex notation, treating vectors as complex numbers and J as the square root of −1[7]. Finally, B is the viscous damping coefficient, H is the rotor inertia, $\tau$ is the load torque, and C is the coulomb friction coefficient. Note that coulomb friction always acts to retard rotor motion, independent of the direction of the rotor motion.

The state-space model (1)–(3) is nonlinear. The electrical nonlinearity can be significantly simplified through the use of the $d_q$ transformation where the target reference frame is fixed to the rotor [4]. By so transforming the motor dynamics into the rotor frame, the electrical dynamics become linear and time-invariant when the motor runs at constant speed. Furthermore, the small-signal dynamics for all states about a constant speed equilibrium are linear and time-invariant. This result is useful when studying the dynamics of an observer.

The $d_q$ transformation is conveniently described using the matrix J and the matrix exponential. Define new electrical variables as $$\bar{i} = \exp(-JN\theta)i \quad (5)$$

$$\bar{v} = \exp(-JN\theta)\gamma \quad (6)$$

where $\bar{i} = [i_d i_q]^T$ and $\bar{v} = [v_d v_q]^T$. The negative sign in the exponential arises from the fact that positive rotation of the rotor looks like negative rotations of the stator when viewed from the rotor. Substituting (5) and (6) in (1) and (2) yields the transformed model $$\frac{d\bar{i}}{dt} = -\left(\frac{R}{L}I + JN\omega\right)\bar{i} - \frac{K}{L}N\omega\begin{bmatrix}0\\1\end{bmatrix} + \frac{1}{L}\bar{v} \quad (7)$$

$$\frac{d\omega}{dt} = -\frac{B}{H}\omega + \bar{i}^T\frac{KN}{H}\begin{bmatrix}0\\1\end{bmatrix} - \frac{C}{H}\frac{\omega}{|\omega|} - \frac{1}{H}\tau \quad (8)$$

$$\frac{d\theta}{dt} = \omega. \quad (9)$$

Note that even if rotor speed is constant, the mechanical subdynamics are still nonlinear if the coulomb friction term is included in (8). If rotor speed is not assumed to be constant then the electrical subdynamics are nonlinear due to the cross product involving $\omega$ and $\bar{i}$ in (7).

The general form of (7)–(9) is $$\frac{dx}{dt} = f(\bar{x},\bar{u}) \quad (10)$$

where the driving input $\bar{u}$ corresponds to the rotor-frame stator voltage $\bar{v}$ and the state vector $\bar{x}$ is $$\bar{x} = [\bar{i}\ \omega\ \theta]^T. \quad (11)$$

If an output vector of the system is defined to be the rotor-frame stator currents, then the system output function is $$\bar{y} = \bar{i}. \quad (12)$$

The system is driven by the stator voltge, $v$ and the resulting output is the stator current $\bar{i}$.

To implement the system (10) and (12), rotor position information is needed which is usually obtained from an external position sensor. This position information is used to rotate the driving stator voltages into the rotor reference frame using (6). Assume, however, that the rotor position is an estimated position rather than a measured position. Denoting estimated values with a superscript carat, the dq-transformed model with estimated driving voltages would thus be $$\frac{d\hat{\bar{i}}}{dt} = -\left(\frac{R}{L}I + JN\hat{\omega}\right)\hat{\bar{i}} - \frac{K}{L}N\hat{\omega}\begin{bmatrix}0\\1\end{bmatrix} + \frac{1}{L}\hat{\bar{v}} \quad (13)$$

$$\frac{d\hat{\omega}}{dt} = -\frac{B}{H}\hat{\omega} + \hat{\bar{i}}^T\frac{KN}{H}\begin{bmatrix}0\\1\end{bmatrix} - \frac{C}{H}\frac{\hat{\omega}}{|\hat{\omega}|} - \frac{1}{H}\tau \quad (14)$$

$$\frac{d\hat{\theta}}{dt} = \hat{\omega}. \quad (15)$$

If $\hat{\theta}$ is not precisely equal to $\theta$, then the driving voltage will incorrectly drive the model, and thus all of the state estimates will contain some error. Note, however, that the incorrect voltage will act to correct the error in $\theta$. For example, if $\hat{\theta}$ is too large, then the voltage driving the dq model will appear to have extra lag angle which will tend to pull the model rotor backward and thus reduce the position error. Therefore, (13)–(15) is an observer since there is a feedback correction loop. If simulations of this observer where the estimated position $\hat{\theta}$ is used in the transformation of (6), are run, the results are disappointing. This is due to the fact that correction occurs only in the electrical variables. Since the electrical and mechanical subdynamics of the system are only loosely coupled [9], errors in position are corrected no faster than the mechanical time constant of the system. In fact, the phase lag of the position estimate causes it to converge slower than the mechanical time constant.

The standard form of identity observer innovation, $$\frac{d\hat{x}}{dt} = f(\hat{x},u) + G(y - C\hat{x}), \quad (16)$$

provides guidance on how to proceed. In particular, the full gain matrix G provides for the inclusion of innovation in the mechanical subdynamics. By including a residual in (14), the rotor position will be directly affected by any error in the measured currents. The electrical and mechanical subdynamics will be tightly coupled. In contrast, in speed estimation embedded in field-oriented controllers for induction motors this might not be desirable since the wide separation of time scales between the electrical and mechanical subdynamics is often used to reduce the order of the model. Typically, the rotor speed is assumed to be constant with respect to the fast electrical subdynamics. The rotor position information, if needed, is obtained by integrating the speed estimate open-loop and is thus subject to biases. By closing a position feedback loop into the electrical subdynamics, errors will exist in the observer until the position estimate is correct.

The dq transformation is a vehicle to use to feed position information into the electrical dynamics. Assuming the estimated currents $\hat{i}_d$ and $\hat{i}_q$ are correct, the measured stator currents $i_\alpha$ and $i_\beta$ must transform precisely into the estimated dq frame using the position estimate. If they do not, then the position estimate must be incorrect and a resulting error signal should be generated to effect a correction.

Applying the ideas embodied in (16), the revised observer is $$\frac{d\tilde{\check{i}}}{dt} = -\left(\frac{R}{L}I + JN\hat{\omega}\right)\check{\tilde{i}} - \frac{K}{L}N\hat{\omega}\begin{bmatrix}0\\1\end{bmatrix} + \frac{1}{L}\check{v} \quad (17)$$

$$+ G_{2\times 2}(\check{\tilde{i}} - \check{i})$$

$$\frac{d\hat{\omega}}{dt} = -\frac{B}{H}\hat{\omega} + \check{\tilde{i}}^T T \frac{KN}{H}\begin{bmatrix}0\\1\end{bmatrix} - \frac{C}{H}\frac{\hat{\omega}}{|\hat{\omega}|} - \frac{1}{H}\tau \quad (18)$$

$$+ G_{1\times 2}(\check{\tilde{i}} - \check{i})$$

$$\frac{d\hat{\theta}}{dt} = \hat{\omega}. \quad (19)$$

This observer is severely nonlinear. Unlike a linear observer, the driving input is not a linear function. Furthermore, the measurement y must be transformed into $\check{y}$ in the estimated rotor frame. These transformed measurements are denoted by an inverted superscript carat in (17) and (18), $$\check{i} = \exp(-JN\hat{\theta})\,\tilde{i} \quad (20)$$

where i is the current measured at the terminals of the motor. Note that there is no innovation in the position equation (19). Including innovation in this equation introduces measurement noise directly into the position estimate and the smoothing effect of the integration of the speed is lost.

Figure 2:
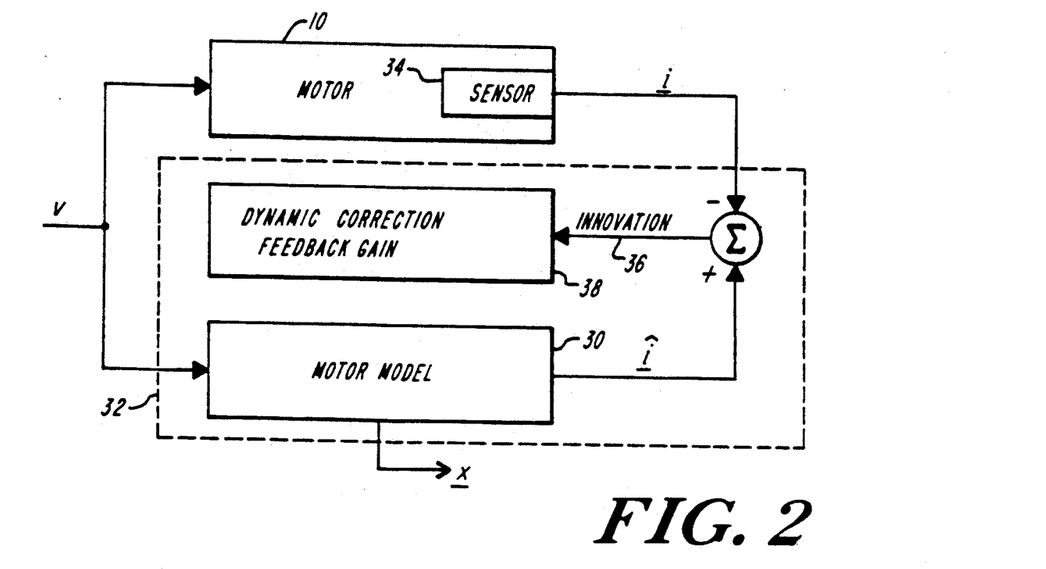
FIG. 2 is a block diagram of one embodiment of the observer of the invention.

An observer according to the invention is illustrated in FIG. 2. A voltage v is introduced into the motor 10 and also into a motor model 30 within an observer section 32 within the dotted box. The motor 10 includes a sensor 34 which generates an output current i. The current i is compared with an estimated current to generate an innovation signal 36. The innovation signal 36 is multiplied by a dynamic correction feedback gain 38 and introduced into the motor model 30. The output of the motor model 30 is an estimate of the state vector of the system. The dynamic correction feedback gain 38 corresponds to the matrix G in equations (17) and (18).

Figure 3:
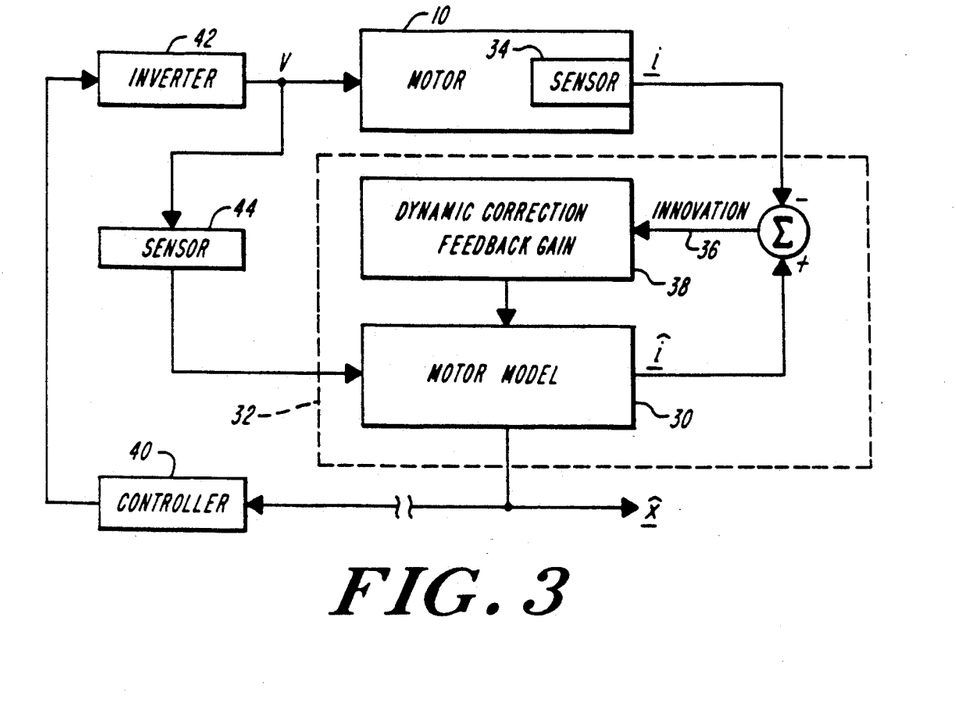
FIG. 3 is a block diagram of another embodiment of the observer of the invention.

Another embodiment of the observer of the invention is shown in FIG. 3. In this embodiment a controller 40 is input into an inverter 42 which generates a voltage to drive the motor 10. A sensor 44 measures the voltage from the inverter 42 which is input into the motor model 30. Note that the output state vector from the motor model may be used as an input to the controller 40 to operate the system in a closed loop fashion if desired.

Analytically predicting the large signal behavior of the observer (17)–(19) is difficult. Therefore, simulations have been performed to verify its large signal performance. Parameters for a 2.75-kW motor are used, and are listed in the Appendix. Details of the simulations are also included in the Appendix. Three types of transients are considered over the operating range of the motor. These transients are:

1. starting the observer from rest with the motor already running at a constant speed,
2. starting both the motor and observer from rest and ramping the motor up to a steady state speed where the initial motor shaft position is known, and
3. starting both the motor and observer from rest and ramping the motor up to a steady-state speed with the initial motor shaft position unknown.

Figure 4:
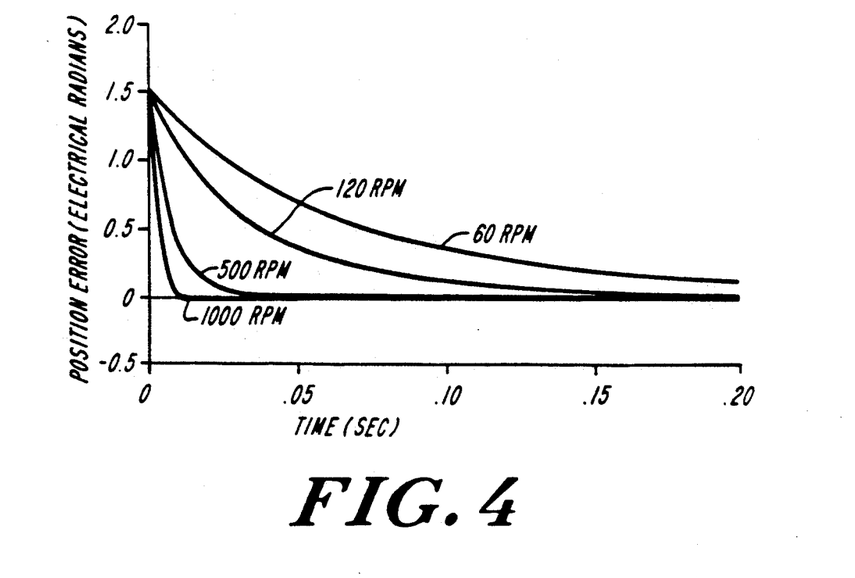
FIG. 4 is a graph of observer position error response from rest for the motor running at constant speed.

Consider the first type of transient. Simulation results are shown in FIG. 4 where the observer position error is plotted against time for several different motor speeds. For each trace, the initial state of the motor corresponds to that which would yield constant velocity when the angle of the driving voltage is zero at time zero. The initial conditions of the observer are all zero.

Figure 5:
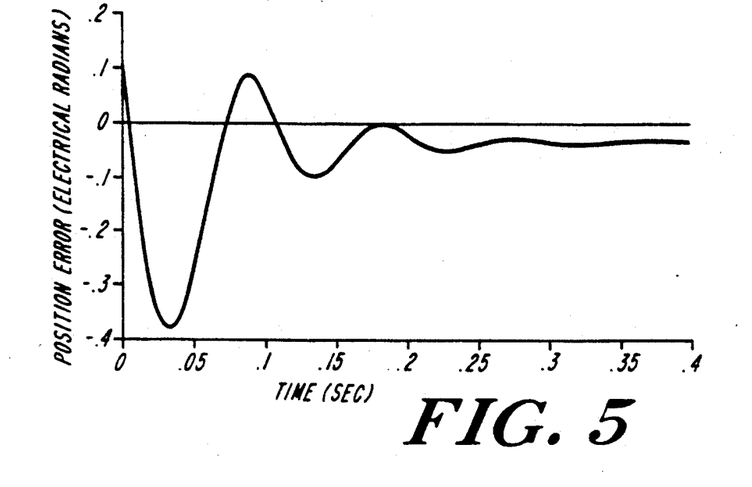
FIG. 5 is a graph of open loop position error response of a stator-frame simulation with initial conditions perturbed 10% from the 1000 rpm steady state.
Figure 6:
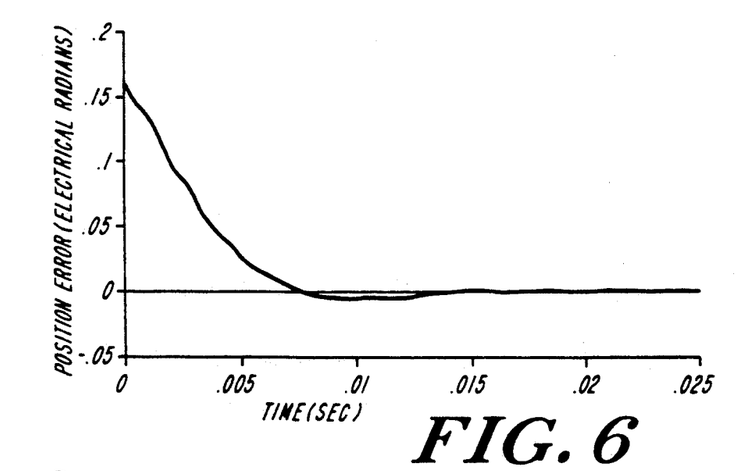
FIG. 6 is a graph of non-linear observer error response with initial conditions perturbed 10% from the 1000 rpm steady state.

The observer performance shown in FIG. 4 is very fast. For comparison, consider an open-loop simulation of (1)–(3) driven by voltages appropriate for operation at 1000 rpm with initial conditions perturbed 10% from the 1000 rpm steady-state. The result is shown in FIG. 5. Now consider the observer response to the same driving voltages and initial conditions. The result is shown in FIG. 6 where the convergence rate is almost an order of magnitude faster.

Figure 7:
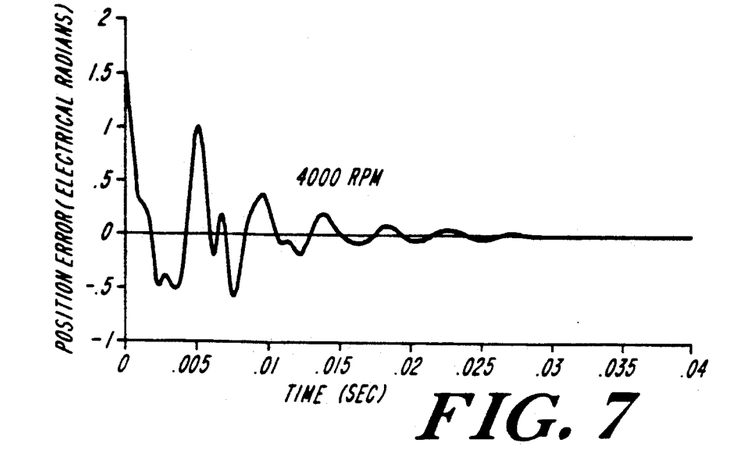
FIG. 7 is a graph of observer position error response from rest for the motor running at 4000 rpm.

The observer becomes more sluggish at slow speeds. This is not surprising as there is less back-emf in the current measurements for the observer to utilize. By increasing the innovation gains, the convergence rate of the observer at slow speeds can be improved. However, the tradeoff is that at high speeds, where the back-emf is large, the observer may become unstable. For example, if the motor is running at 4000 rpm and the observer is started from rest, the resulting error response is shown in FIG. 7. Though still stable, the error response has become quite oscillatory. As the speed is increased further, the observer is unstable. An improvement to the proposed observer uses gain scheduling dependent on rotor speed.

Figure 8:
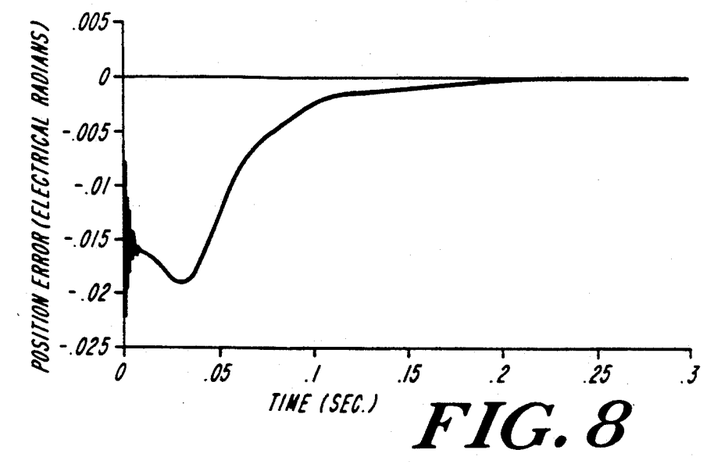
FIG. 8 is a graph of observer position error response for the motor ramping to 1000 rpm with initial rotor position known.

It is not possible to determine the position of the rotor of a smooth rotor permanent magnet synchronous motor when the rotor is not rotating. Therefore, during the initial startup of the motor, the initial estimated position may be substantially incorrect. Also at startup, there is a time when the motor is operating at a slow speed where it is seen in FIG. 4 that the observer is sluggish. Therefore, the second type of transient is considered to determine if the observer can follow a motor starting from rest. The assumption is initially made that a calibration routine is executed when the motor is first powered up where the phases are excited open loop by the controller and the observer is allowed to converge to an accurate estimate of the position. Therefore, on startup it is assumed that the state of the observer is identical to the state of the motor. Observer error dynamics for this test are shown in FIG. 8 where the motor is run up to 1000 rpm in 0.2 seconds from zero initial conditions. Note the small, high-speed oscillation and subsequent error in the observer estimate even though the initial conditions of the motor are precisely known. This is a result of the simple improved Euler integration algorithm used to implement the observer. The system is somewhat stiff and the integration algorithm initially has some difficulty converging. Further details of the simulation are given in the Appendix.

Figure 9:
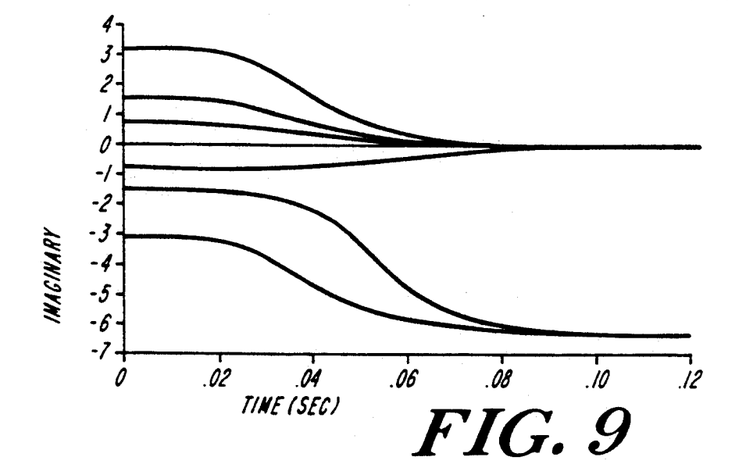
FIG. 9 is a graph of observer position error response for the motor ramping to 1000 rpm with initial rotor position unknown.

Finally, the assumption that a calibration routine is executed at motor startup is relaxed. The motor is ramped up to 1000 rpm from zero initial conditions while the observer is started from various initial rotor positions with all other observer states zero. Simulation results are shown in FIG. 9. Since the electrical cycles are identical, the observer may slip an electrical cycle if the initial observer rotor position is too far behind the true initial rotor position. For many applications this behavior is acceptable. For servo applications it might not be.

The stability of the observer is an important issue, particularly since its nonlinear structure precludes definitive statements based on an eigenvalue analysis. The strongest statements can be made using a summarizing function, such as a Liapunov function, to find the large-signal conditions where the system is stable. Unfortunately, no such function has yet been found. In its place, a linearized stability analysis is used.

Rather than determine the stability of the observer itself, it is advantageous to determine the stability of its error dynamics. By using error dynamics, the objective of the stability analysis is always clear: the states in the error dynamics should decay to the origin. Also, the error dynamics are naturally linearized about the origin. The observer estimation error is defined as $$e = [e_i e_{107} e_{74}]^T = \hat{\underline{x}} - \underline{x} \qquad (21)$$

where $e_i = [e_d e_q]^T$. By substituting (7)–(9) and (17)–(19) in (21), an error system is derived that depends on the operating point of the motor. The error dynamics are $$\frac{de_i}{dt} = -\left(\frac{R}{L}I + JNe_\omega\right)e_i - JN(\omega_e e_i + e_\omega \underline{\bar{i}}) \qquad (22)$$

$$- \frac{K}{L}Ne_\omega \begin{bmatrix} 0 \\ 1 \end{bmatrix} + \frac{1}{L}[(\exp(-JNe_\theta) - I)\underline{\bar{v}}]$$

$$+ G_{2\times 2}[(\exp(-JNe_\theta) - I)\underline{\bar{i}} - e_i]$$

$$\frac{de_\omega}{dt} = \frac{KN}{H}(e_q + G_{1\times 2}[(\exp(-JNe_\theta) - I)\underline{\bar{i}} - e_i]) \qquad (23)$$

$$- \frac{B}{H}e_\omega$$

$$\frac{de_\theta}{dt} = e_\omega. \qquad (24)$$

Figure 10:
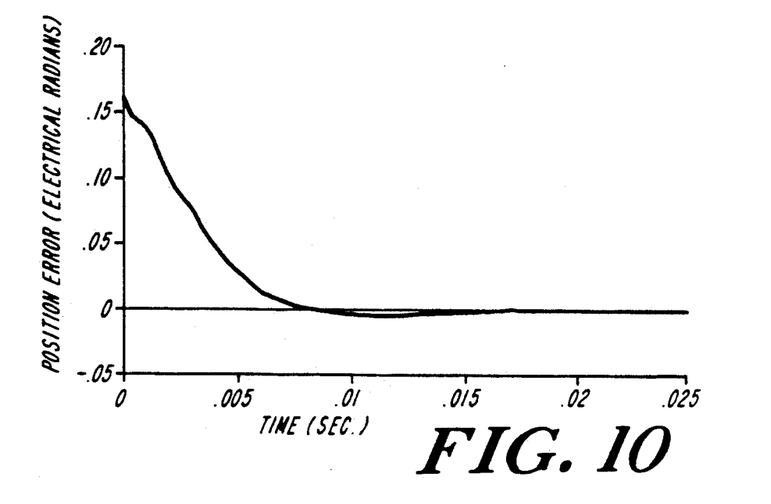
FIG. 10 is a graph of linear observer error response with initial conditions perturbed 10% from the 1000 rpm steady state.

Linearizing about zero error yields $$\begin{bmatrix} \dot{\tilde{e}}_d \\ \dot{\tilde{e}}_q \\ \dot{\tilde{e}}_\omega \\ \dot{\tilde{e}}_\theta \end{bmatrix} = \begin{bmatrix} -\frac{R}{L} - G_{11} & N\omega_e - G_{12} & & i_q \\ -N\omega_e - G_{21} & -\frac{R}{L} - G_{22} & -\frac{K}{L} & -i_d \\ -G_{31}\frac{KN}{H} & (1 - G_{32})\frac{KN}{H} & -\frac{B}{H} & \\ 0 & 0 & 1 & \end{bmatrix} \qquad (25)$$

$$\begin{bmatrix} G_{11}i_q - G_{12}i_d + \frac{1}{L}v_q \\ G_{21}i_q - G_{22}i_d - \frac{1}{L}v_d \\ \frac{KN}{H}(G_{31}i_q - G_{32}i_d) \\ 0 \end{bmatrix} \begin{bmatrix} \tilde{e}_d \\ \tilde{e}_q \\ \tilde{e}_\omega \\ \tilde{e}_\theta \end{bmatrix}$$

where a superscript tilde denotes a perturbation about equilibrium. The error dynamics depend on the operating point of the motor. For small perturbations, the linearized error system describes the nonlinear error dynamics well. For example, consider starting the observer with the states perturbed 10% from the steady-state values for the motor operating at 1000 rpm. The nonlinear response of (22)–(24) is shown in FIG. 6 and the response of the linearized system (25) is shown in FIG. 10.

Figure 11:
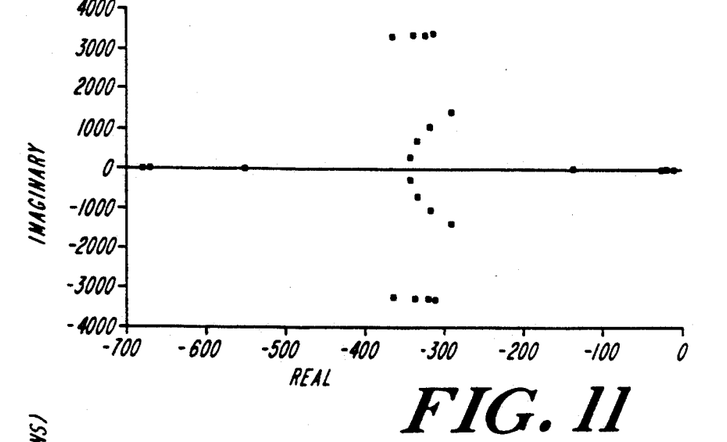
FIG. 11 is a graph of the root locus with respect to speed of the linearized error system.

A root locus of the system (25) with respect to rotor speed for the gain set given in the Appendix is shown in FIG. 11. The locus corresponds to steady state motor operation at 60, 120, 500, 1000, 2000, 3000, and 4000 rpm. At slow speed there is a pole near zero which accounts for the slow, overdamped position error response. At high speeds the mechanical subdynamics become oscillatory. Note, in particular, the close proximity of the mechanical and electrical subdynamics.

Unfortunately, it is not possible to predict global stability of the nonlinear error system from the linearized error system. It is easy to find large signal perturbations about a steady state for which the nonlinear error system is unstable even though the eigenvalues of the linearized system all have negative real parts. For example, with the gain set used for all of the simulations in this specification, the observer is unstable when trying to lock on from rest to a motor running at 5000 rpm, even though the eigenvalues predict stability. Fortunately, such extreme large signal conditions may be avoided under the projected methods of observer operation discussed above.

Figure 12:
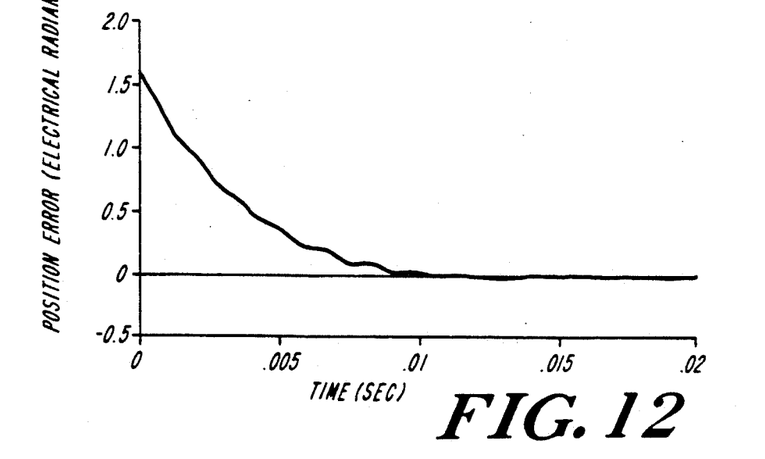
FIG. 12 is a graph of observer position error response from rest with sensor noise for the motor running at 1000 rpm.
Figure 13:
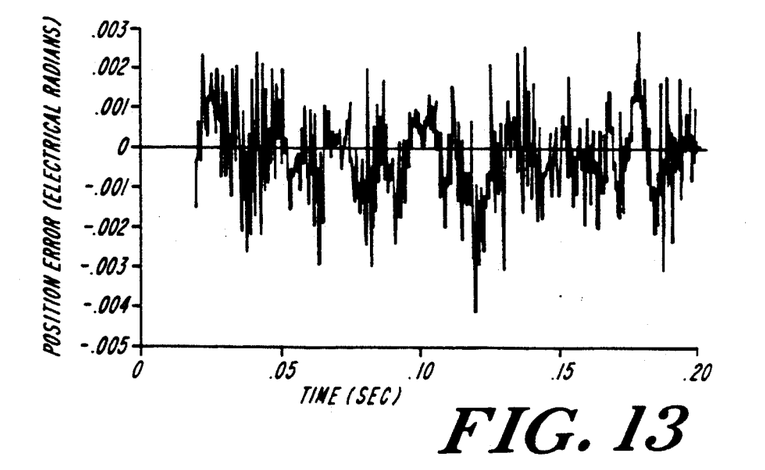
FIG. 13 is a graph of observer position error in steady state with sensor noise for the motor running at 1000 rpm.

It is important to consider the stability and performance of the observer in the presence of modeling uncertainties and sensor noise. Modeling uncertainties include incorrect parameter values and modified dynamics such as from magnetic saturation. Sensor noise enters when the currents and voltages are measured. Simulations are run where sensor noise, modeled as zero-mean Gaussian distributed noise, is included in order to verify that the observer is robust against sensor noise. A typical simulation result is shown in FIG. 12 where the conditions are the same as in FIG. 4 except that sensor noise with a standard deviation of 100 mV and 100 mA has been added. The noise does not affect the global stability or convergence of the observer. Its primary effect is near steady state where errors in the measured stator-frame stator current affect the estimated speed, which in turn affects the estimated position. FIG. 13 illustrates the magnitude of the steady state noise in the position estimate. Even in the presence of the noise, the observer is accurate to 1 part in 17000, rms.

The observer of the invention is an identity observer and therefore the parameters in the observer must be identical to the physical parameters of the motor. If they are different, then the performance of the observer will suffer. The load torque is a parameter subject to the most drastic change over the course of motor operation. It is found in simulations that a mismatch in load torque parameters will cause a steady-state position estimate error. However, it is also found that as long as it is less than the true load torque, the steady-state position error will be extremely small, on the order of 1 part in 30,000 for a worst case of rated true torque and zero observer torque. If the observer parameter is greater than the true torque, it found that the steady state error becomes much worse. It is suspected that this is because the observer is not being driven by enough voltage and thus relatively large current errors develop to compensate.

APPENDIX

Note the use of electrical radians in all simulated error plots. The parameters used in all the simulations in this specification are $N = 3$ -continued $L = 0.445$ mH
$R = 0.36 \Omega$
$K = 0.110 \, V \cdot s$
$H = 6.4 \times 10^{-3}$ kg $\cdot$ m$^2$
$B = 2.0 \times 10^{-3} \, N \cdot m \cdot s \cdot$ rad$^{-1}$
$C = 0.375 \, N \cdot m$
$\tau = 1.6 \, N \cdot m$ The observer gain matrix used in all simulations is $$G = \begin{bmatrix} G_{2\times 2} \\ G_{1\times 2} \end{bmatrix} = \begin{bmatrix} -200 & 100 \\ 100 & -200 \\ 100 & -300 \end{bmatrix}.$$

With the exception of FIG. 10, all error responses are generated by simultaneously simulating the motor (1)–(3) and observer (17)–(19) and then computing the error states according to (21). The motor equations are solved using the multistep Runge Kutta Fehlberg routine RKF45[1]. Absolute and relative error tolrances are set at $1 \times 10^{-5}$. The observer equations are solved using the simple improved Euler method, much as they might be in a real-time implementation. In this way, real-time integer arithmetic implementation only introduces the new errors of numerical quantization and saturation. Some of the effects of using a simple differential equation solver have already been noted in FIG. 8. The observer system is somewhat stiff and thus a small fixed step size of 200 $\mu$s is chosen. In simulations where the motor is ramped up to a steady velocity, the initial conditions are all zero and the phase voltages are applied open-loop at a magnitude consistent with small direct currents at the final, steady-state speed.

REFERENCES

[1] Forsythe, George E., Michael A. Malcolm, and Cleve B. Moler, Computer Methods for Mathematical Computations, Prentice-Hall, Inc., Englewood Cliffs, N.J., 1977.

[2] Gharban, C. K. and B. J. Cory, Non-Linear Dynamic Power System State Estimation, IEEE Trans. on Power Systems, PWRS-1(1986), No. 3, pp. 276-283.

[3] Jones, Charles V., The unified Theory of Electrical Machines, Butterworth & Co., Ltd., London, 1967.

[4] Krause, Paul C., Analysis of Electric Machinery, McGraw-Hill Book Company, N.Y., 1986.

[5] Leonhard, W., Control of Electrical Drives, Springer-Verlag, N.Y. 1985.

[6] Lumsdaine, A., J. H. Lang, and M. J. Balas, A State Observer for Variable Reluctance Motors, Proc of the 15th Ann. Symp. on Incremental Motion Control Systems and Devices, Urbana, Ill. 1986, pp. 267-273.

[7] Novotny, D. W. and J. H. Wouterse, Induction Machine Transfer Functions and Dynamic Response by Means of Complex Time Variable, IEEE Trans. on Power Apparatus and Systems, PAS-96 (1976), No. 4, pp. 1325-1335.

[8] Okongwu, E. H., W. J. Wilson, and J. H. Anderson, Optimal State Feedback Control of a Microalternator Using an Observer, IEEE Trans. on Power Apparatus and Systems, PAS-97 (1978), No. 2, pp. 594-602.

[9] Verghese, George C., Jeffrey H. Lang, and Leo F. Casey, Analysis of Instability in Electrical Machines, IEEE Trans. on Industry Applications, IA-22 (1986), No. 5, pp. 853-864.

[10] Yamashita, K., and T. Tanguchi, On the Estimation of the Transient State of a Synchronous Machine by an Optimal Observer, Int. J. Control, 41 (1985), No. 2, pp. 417-428.

We claim:

1. Controller for a permanent magnet synchronous motor having a single harmonic of air gap flux driven by known motor phase voltages, comprising:
   apparatus adapted to measure motor phase currents;
   computing apparatus adapted to compute estimates of electrical and mechanical states of the motor from observer model equations, said electrical states being parameters relating to the motor phase currents and said mechanical states being parameters relating to rotor speed and position, said observer model equations being derived from state equations of motor dynamics transformed into the rotor frame of reference, the computation being performed in response to the motor phase voltages and a parameter relating to the difference between measurements of the motor phase currents and estimates of the motor phase currents obtained from the estimates of the electrical states of the motor, and
   means responsive to said estimates of the electrical and mechanical states of the motor for controlling the phase voltages of the motor.

2. The controller of claim 1 wherein the motor has a wound rotor.

3. The controller of claim 1 wherein said observer model have the form $$\frac{d\hat{i}}{dt} = -\left(\frac{R}{L}I + JN\hat{\omega}\right)\hat{i} - \frac{K}{L}N\hat{\omega}\begin{bmatrix}0\\1\end{bmatrix} + \frac{1}{L}\hat{v}$$
$$+ G_{2\times 2}(\underline{i} - \hat{\underline{i}})$$

$$\frac{d\hat{\omega}}{dt} = -\frac{B}{H}\hat{\omega} + \hat{i}^T\frac{KN}{H}\begin{bmatrix}0\\1\end{bmatrix} - \frac{C}{H}\frac{\hat{\omega}}{|\hat{\omega}|} - \frac{1}{H}\tau$$
$$+ G_{2\times 2}(\underline{i} - \hat{\underline{i}})$$

$$\frac{d\hat{\theta}}{dt} = \hat{\omega}$$

where i is motor current, v is voltage applied to the motor, L is stator phase inductance, R is stator phase resistance, K is the magnet constant, N is the number of magnet pole pairs on the motor rotor, $\theta$ is rotor position, $\omega$ is rotor velocity, B is the viscous damping coefficient, H is the rotor inertia, $\tau$ is the load torque, C is the coulomb friction coefficient, and G is the dynamic correction feedback gain.

4. The controller of claim 1 further including apparatus adapted to measure the phase voltages applied to the motor, the calculation being performed in response to the measurements of the motor phase voltages.

5. The controller of claim 1 wherein said parameter relating to the difference between measurements of the motor phase currents and estimates of the motor phase currents is said difference multiplied by a dynamic correction feedback gain.

* * * * *

UNITED STATES PATENT AND TRADEMARK OFFICE
CERTIFICATE OF CORRECTION

PATENT NO. : 5,296,794

DATED : March 22, 1994

INVENTOR(S) : Jeffrey H. Lang and Lawrence A. Jones

It is certified that error appears in the above-indentified patent and that said Letters Patent is hereby corrected as shown below:

Column 6, lines 18 and 29: delete "$\theta$" and insert therefor -- $\hat{\theta}$ --;

Column 6, equation (16): substitute the following equation:

$$\frac{d\underline{x}}{dt} = \underline{f}(\hat{\underline{x}}, \underline{u}) + G(\underline{y} - C(\hat{\underline{x}}))$$

Column 6, line 63: delete "$\hat{\underline{i}}_d$" and "$\hat{\underline{i}}_q$" and insert therefor -- $\hat{i}_d$ -- and -- $\hat{i}_q$ --;

Column 6, line 64: insert a space between "$i_\alpha$" and "and, also between "$i_\beta$" and "must";

Column 7, line 19: delete "y" and insert therefor -- $\underline{y}$ --;

Column 9, equation (21): substitute the following equation:

$$\underline{e} = [\underline{e}_i e_\omega e_\theta]^T = \hat{\underline{X}} - \underline{X}$$

Column 9, equation (22) substitute the following equation:

$$\frac{d\underline{e}_i}{dt} = -\left(\frac{R}{L}I + JNe_\omega\right)\underline{e}_i - JN(\omega_e \underline{e}_i + e_\omega \underline{I})$$

UNITED STATES PATENT AND TRADEMARK OFFICE
CERTIFICATE OF CORRECTION

PATENT NO. : 5,296,794

DATED : March 22, 1994

INVENTOR(S) : Jeffrey H. Lang and Lawrence A. Jones

It is certified that error appears in the above-indentified patent and that said Letters Patent is hereby corrected as shown below:

Column 1, line 22: delete "effects" and insert therefor -- affects --;

Column 2, line 46: delete "increasese" and insert therefor -- increases --;

Column 2, line 64: delete "$d_q$" and insert therefor -- dq --;

Column 4, lines 49-50: delete all instances of "$\gamma$" and insert therefor -- v --;

Column 5, line 11: delete "$d_q$" and insert therefor -- dq --;

Column 5, line 20: delete "$d_q$" and insert therefor -- dq --;

Column 5, equation (5): substitute the following equation:

$$\underline{\tilde{i}} = \exp(-JN\theta)\underline{i}$$

Column 5, equation (6): substitute the following equation:

$$\underline{\tilde{v}} = \exp(-JN\theta)\underline{v}$$

Column 5, equation (7): substitute the following equation:

$$\frac{d\underline{\tilde{i}}}{dt} = -\left(\frac{R}{L}I + JN\omega\right)\underline{\tilde{i}} - \frac{K}{L}N\omega\begin{bmatrix}0\\1\end{bmatrix} + \frac{1}{L}\underline{\tilde{v}}$$

Column 5, equation (10): substitute the following equation:

$$\frac{d\overline{x}}{dt} = \underline{f}(\overline{x},\overline{u})$$

UNITED STATES PATENT AND TRADEMARK OFFICE
CERTIFICATE OF CORRECTION

PATENT NO. : 5,296,794
DATED : March 22, 1994
INVENTOR(S) : Jeffrey H. Lang and Lawrence A. Jones It is certified that error appears in the above-indentified patent and that said Letters Patent is hereby corrected as shown below:

Column 9, equation (23): substitute the following equation:

$$\frac{de_\omega}{dt} = \frac{KN}{H} (e_q + G_{1x2}[(\exp(-JNe_\theta) - I)\overline{i} - \underline{e}_i$$

Column 11, line 21: delete "tolrances" and insert therefor -- tolerances --; and Column 12, line 33: after "model" and before "have" insert -- equations --.

Signed and Sealed this

Fourth Day of October, 1994

*Attest:*

BRUCE LEHMAN

*Attesting Officer*   Commissioner of Patents and Trademarks